United States Patent [19]

Fisher et al.

[11] Patent Number: 5,474,257

[45] Date of Patent: Dec. 12, 1995

[54] DEPLOYABLE WING

[75] Inventors: Jeffrey A. Fisher; Edward V. Miller, both of Huntsville, Ala.; Dennis Van Dam, Chattanooga, Tenn.

[73] Assignee: USBI Co., Huntsville, Ala.

[21] Appl. No.: 156,322

[22] Filed: Nov. 23, 1993

[51] Int. Cl.⁶ ........................................................ B64C 3/56
[52] U.S. Cl. .......................... 244/49; 244/90 R; 244/901; 244/904
[58] Field of Search ................................... 244/900–904, 244/16, 49, 138 R, 90 R, 75 R

[56] References Cited

U.S. PATENT DOCUMENTS

| Re. 26,427 | 7/1968 | Jalbert | 148/33.1 |
|---|---|---|---|
| 2,764,375 | 9/1956 | Lemoigne | 244/145 |
| 3,507,464 | 4/1970 | Rogalla | 244/901 |
| 3,524,613 | 8/1970 | Reuter et al. | 244/142 |
| 3,558,087 | 1/1971 | Barish | 244/142 |
| 3,599,904 | 8/1971 | Condit et al. | 244/49 |
| 3,679,157 | 7/1972 | Roberts et al. | 244/16 |
| 3,749,337 | 7/1973 | Jalbert | 244/145 |
| 3,822,844 | 7/1974 | Sutton | 244/145 |
| 3,944,169 | 3/1976 | Bede | 244/16 |
| 3,995,799 | 12/1976 | Bartolini | 244/16 |
| 4,050,654 | 9/1977 | Heckman | 244/901 |
| 4,116,406 | 9/1978 | Hamilton | 244/16 |
| 4,116,407 | 9/1978 | Murray | 244/16 |
| 4,708,078 | 11/1987 | Legaignoux et al. | 114/102 |
| 4,742,977 | 5/1988 | Crowell | 244/123 |
| 4,846,423 | 7/1989 | Reuter | 244/145 |
| 4,936,012 | 6/1990 | Shepherd | 29/845 |

FOREIGN PATENT DOCUMENTS

| 2310258 | 12/1976 | France . |
|---|---|---|
| 2549393 | 5/1977 | Germany . |
| 2854939 | 7/1980 | Germany . |
| 3119865 | 12/1982 | Germany . |
| 3322047 | 12/1984 | Germany . |
| 1121181 | 10/1984 | U.S.S.R. . |
| 2050263 | 1/1981 | United Kingdom . |

*Primary Examiner*—Galen L. Barefoot

[57] ABSTRACT

The deployable wing of the present invention comprises an internal structure having diverging leading edge spars attached to a keel spar and cross spars to form a delta wing configuration. This internal structure is enclosed within a volume defined by a fabric sail having an upper section, a lower section, and fabric ribs disposed therebetween. This fabric sail volume is internally pressurized through a ram air intake at the nose stagnation point. This deployable wing can be folded and deployed in the air.

17 Claims, 4 Drawing Sheets

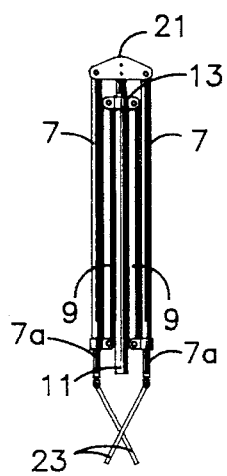
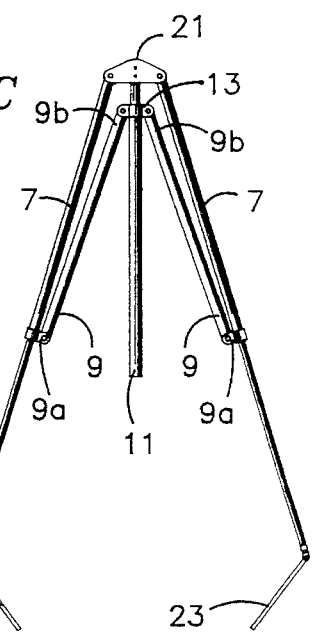
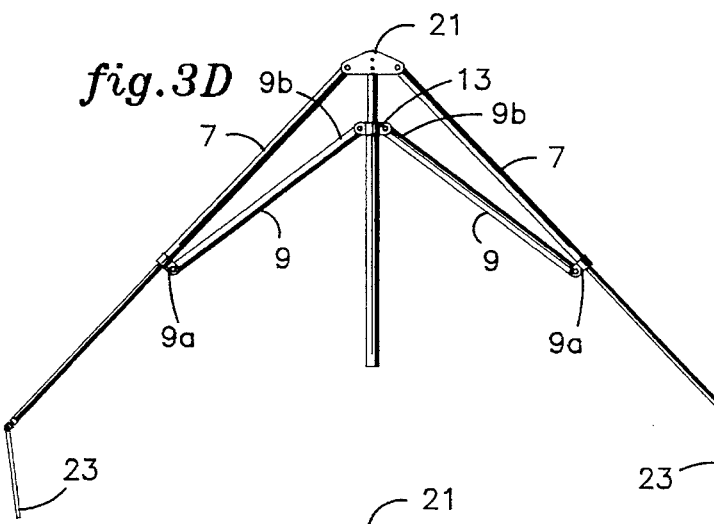
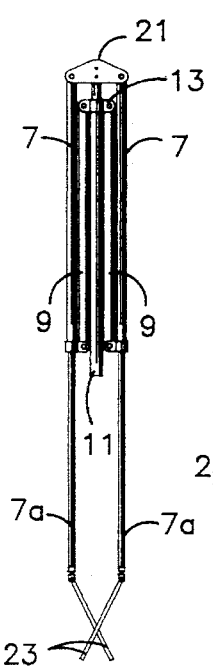
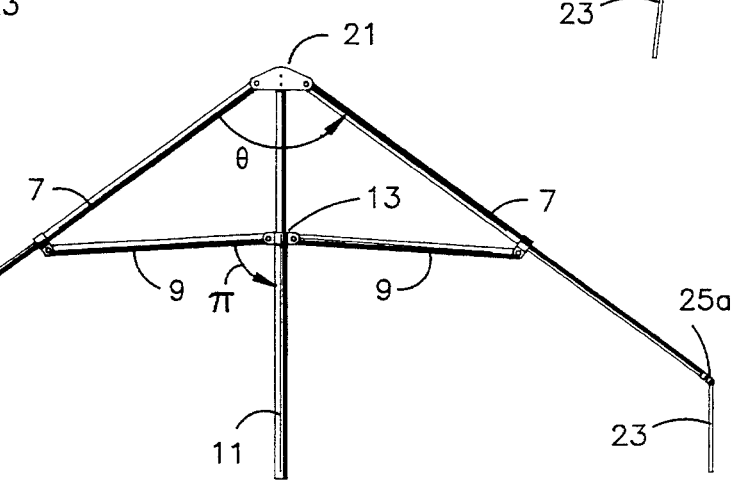

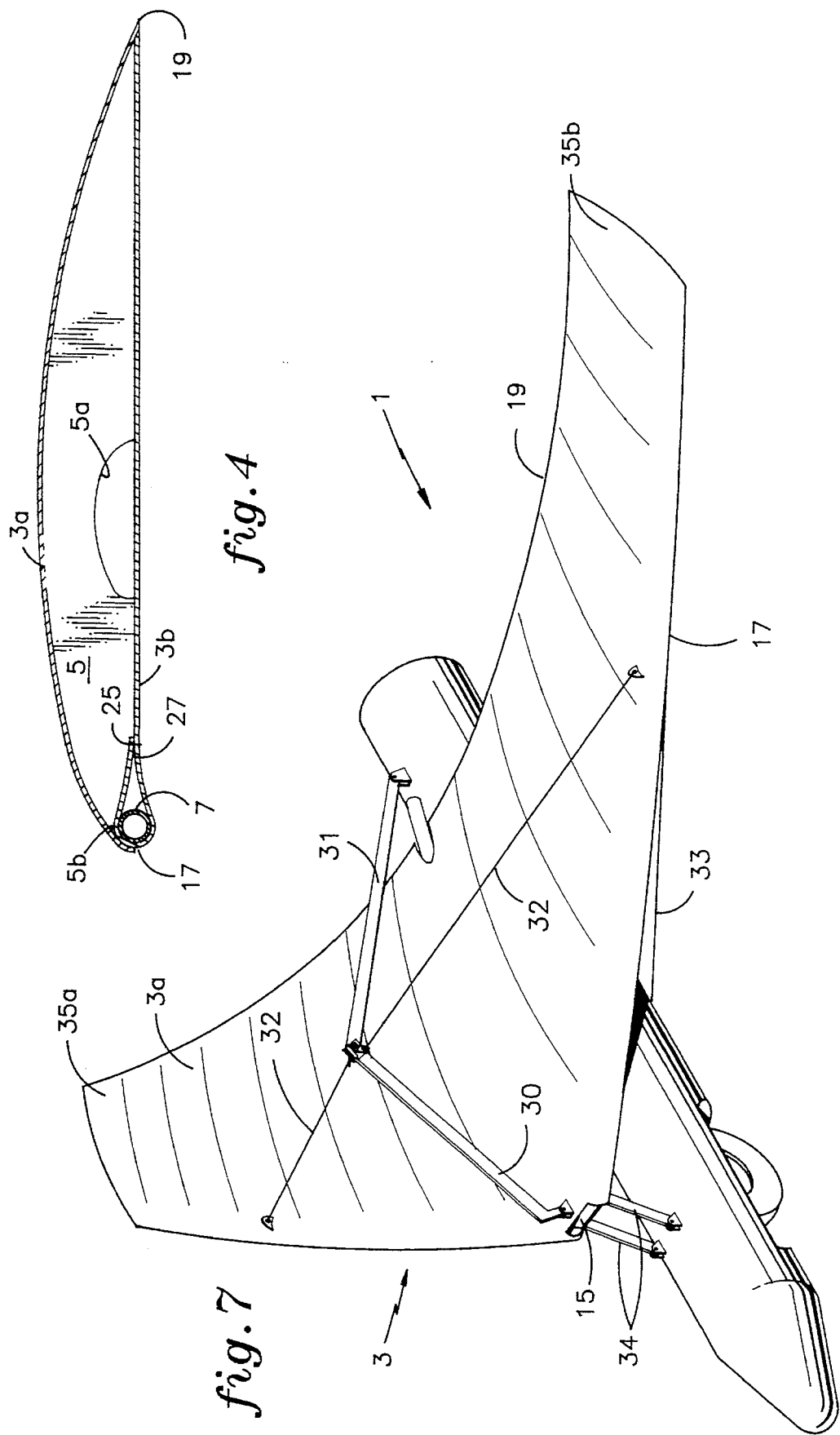

DEPLOYABLE WING

TECHNICAL FIELD

The present invention relates to a wing and especially to a controllable, deployable wing.

BACKGROUND OF THE INVENTION

Hang gliders allow manned flight without the expense or restrictions of powered flight. These gliders are aerodynamically designed such that their lift-to-drag ratio (commonly known as glide ratio) is greater than about 10:1 such that the glider is capable of suspending a flyer for several hours under the proper atmospheric conditions. Hang glider designs range from the popular delta wing design commonly known as a Rogallo wing and intermediate gliders with glide ratios of about 10:1 with docile characteristics to competition gliders with glide ratios as high as 13:1, but with less stable characteristics. The original Rogallo wing (about 45° sweep) had a glide ratio of about 4:1, and modern Rogallo wings (about 30° sweep) have a glide ratio of about 10:1.

The Rogallo wing design largely resembles a traditional kite with a keel, cross members, and diverging leading edge members. Another hang glider design generally similar to the Rogallo wing is disclosed in U.S. Pat. No. 4,116,406 which issued to Hamilton on Sep. 26, 1978. This glider has a double surface fabric airfoil forming an envelope, disposed around a Rogallo frame. This airfoil is inflated during flight as air enters an opening in the nose and exhausts through nozzles in the underside along the trailing edge. Inflating the wing improves its lift at lower air speeds. This hang glider, however, is manually controlled via a weight shift control bar by a flyer harnessed to the glider and is only useful for manned flights and not for operations such as air drops of food, supplies, etc., where manned flights are either too dangerous or impossible.

Parachutes, on the other hand, can and have been utilized for air drops of food, supplies, etc., in remote locations where landing an airplane is either impossible or dangerous. Although these parachutes are useful in reducing the ground impact of the dropped load, it is difficult to ensure the parachute reaches the targeted area. Depending upon the precise parachute release time, the atmospheric conditions during release and flight, and release altitude, the parachute may either reach its target or drift up to about 15 miles or more off course.

What is needed in the art is a remotely controlled device for article recovery and delivery which can be collapsed, deployed in motion, maneuvered, and which has an improved glide ratio.

DISCLOSURE OF THE INVENTION

The present invention relates to a deployable wing. This deployable wing comprises a double membrane fabric sail having an upper section disposed above and joined to a lower section, said sail having a leading edge with a front point, a trailing edge, and wing tips; an internal structure disposed between the upper section and the lower section having two leading edge spars, each with a first end and a second end, said first ends pivotally connected together at approximately the front point, a keel spar connected to and disposed between the leading edge spars at the front point and extending rearward toward the trailing edge, and at least two cross spars pivotally attached to both the leading edge spars and a sliding mechanism which traverses along the keel to the keel spar; a plurality of fabric ribs disposed between and connected to the upper section and the lower section, wherein said fabric ribs define a shape of the fabric sail when inflated and have at least one slot through which the cross spars extend from the keel spar to the leading edge spars and ribs; and a ram air intake located on said leading edge at the stagnation point of the wing during operation.

The foregoing and other features and advantages of the present invention will become more apparent from the following description and accompanying drawings.

BRIEF DESCRIPTION OF THE DRAWINGS

FIGS. 3A–3E are diagrammatical views of the opening mechanism of one embodiment of the deployable wing of the present invention.

FIG. 4 is a cross-sectional view of one embodiment of the wing in its open position.

FIG. 7 is a perspective view of one embodiment of the deployable wing attached to a payload.

The figures are meant to further illustrate the present invention and not to limit the scope thereof.

BEST MODE FOR CARRYING OUT THE INVENTION

Figure 1:
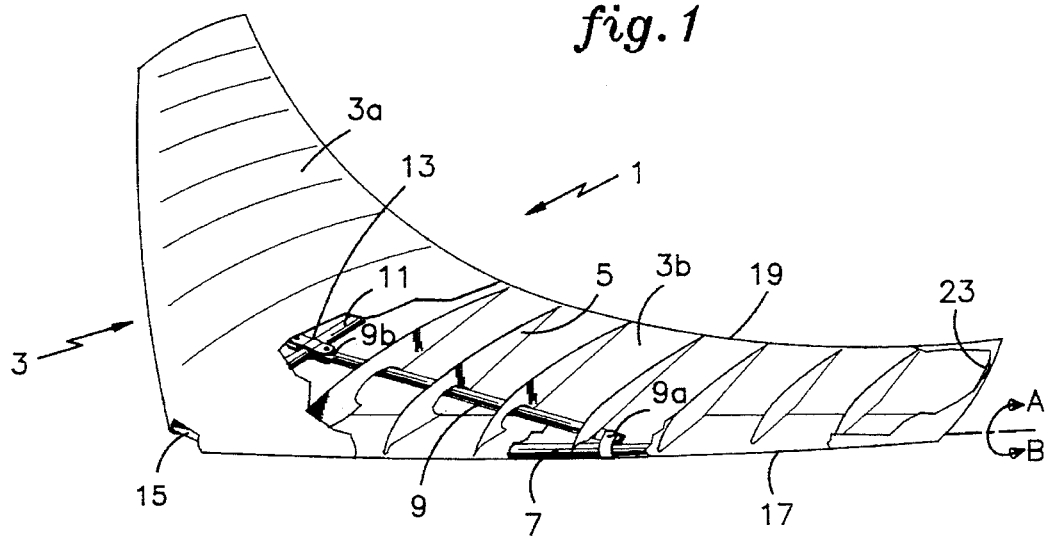
FIG. 1 is a cut-away, side view of one embodiment of the deployable wing of the present invention.
Figure 2:
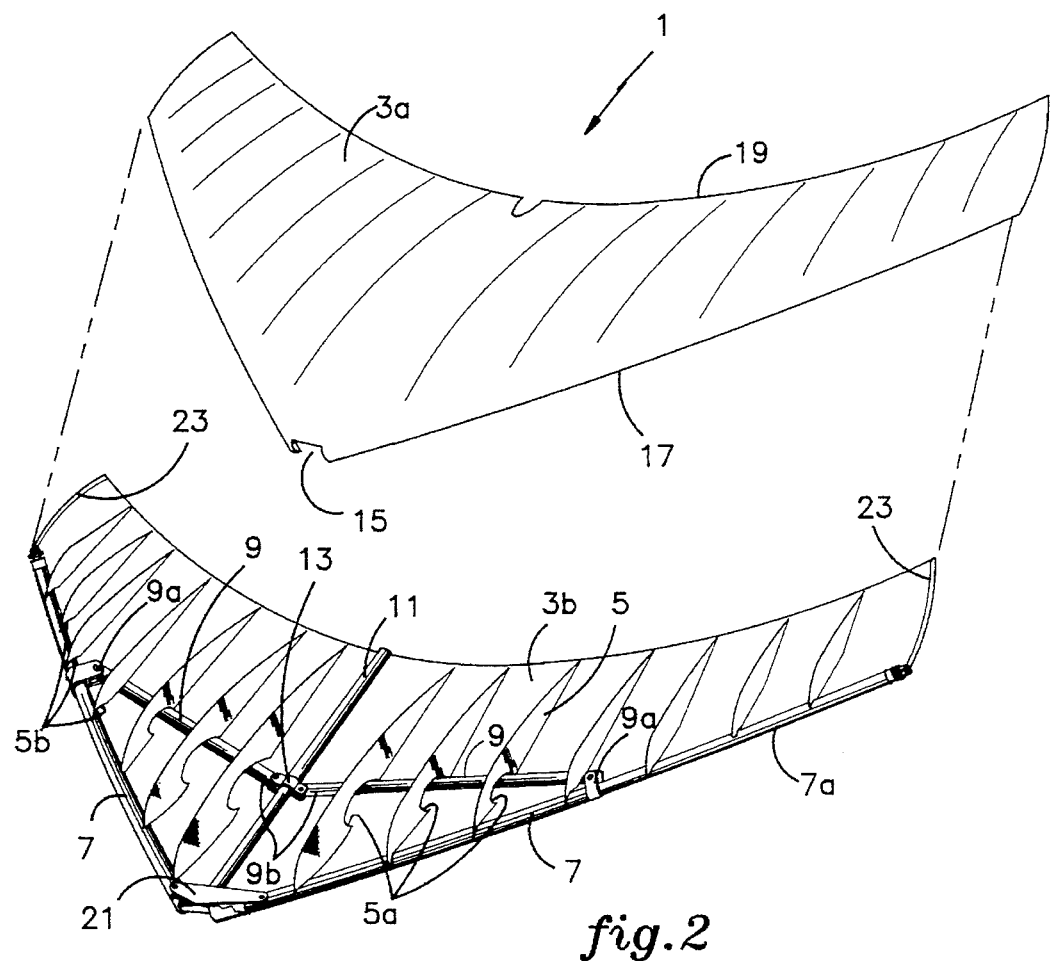
FIG. 2 is an exploded view of one embodiment of the deployable wing of the present invention.
Figure 5:
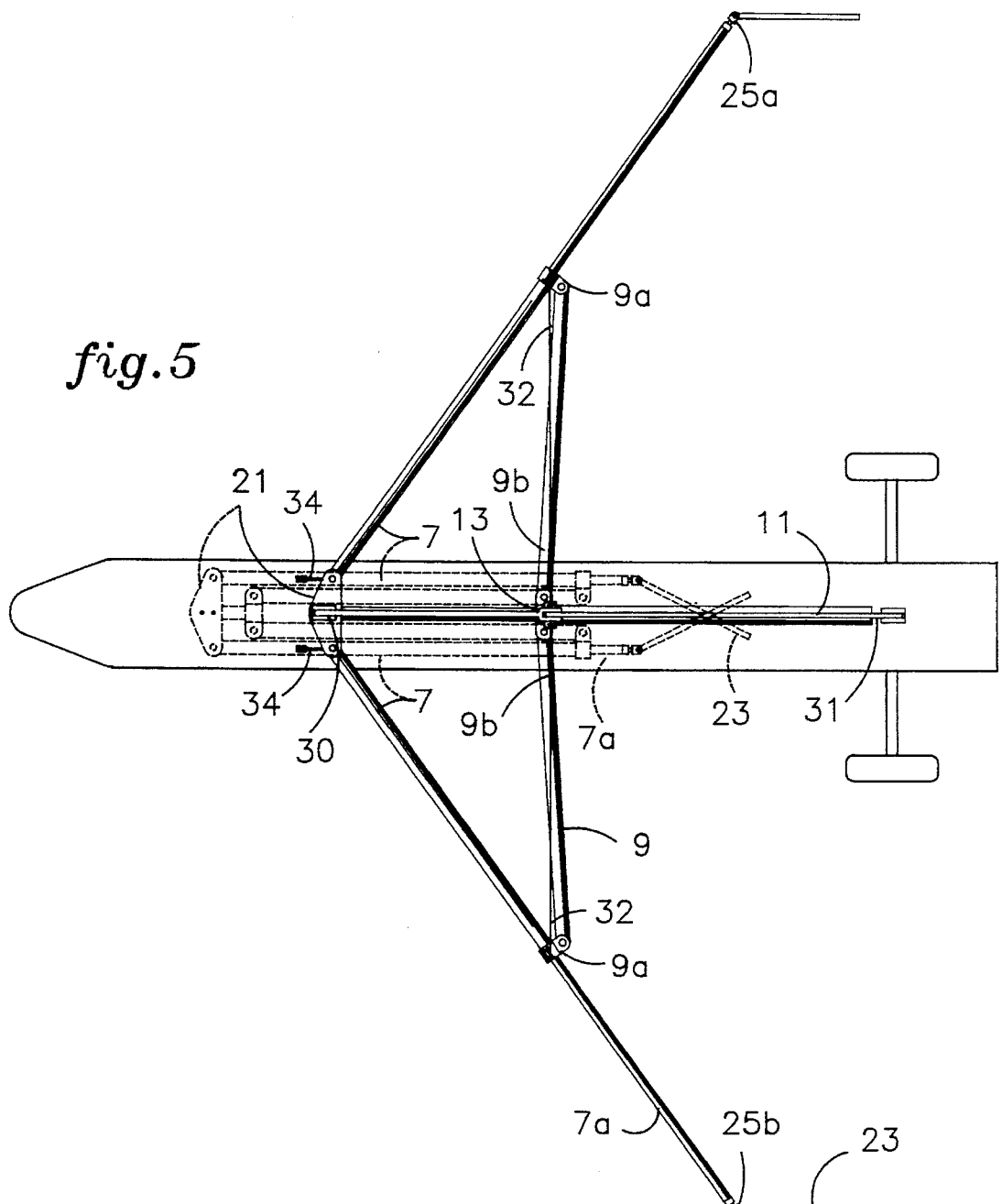
FIG. 5 is a top view of one embodiment of the deployable wing attached to a payload.

The present invention is a deployable wing. Referring to FIGS. 1 and 2, in one embodiment of the present invention, the wing 1 has a fabric sail 3 disposed around both fabric ribs 5 and an internal structure. The internal structure comprises two leading edge spars 7 with retractable telescoping sections 7a, two cross spars 9, a keel spar 11, and a control device such as two elevon struts 23. The leading edge spars 7 are pivotally attached at their foremost point 21 such that in the closed position (FIGS. 3A and 3B) leading edge spars 7 rest substantially parallel to one another and in the open position (FIGS. 3E and 5) they diverge with an angle θ (FIG. 3E) therebetween. The keel spar 11 is similarly connected to the two leading edge spars 7 at point 21 such that in the closed position the keel spar 11 rests substantially parallel to and is disposed between the two leading edge spars 7 while in the open position the keel spar 11 is disposed substantially equidistant between the two leading edge spars 7, thereby bisecting the angle θ. The outboard ends 9a of the cross spars 9 attach to the leading edge spars 7 while the inboard ends 9b pivotally attach to the common slider 13 which moves linearly along the keel spar 11. Finally an elevon strut 23 is connected to each leading edge spar 7 at the end opposite their connection to the keel spar 11.

The internal structure provides structural integrity to the wing 1, functioning as the main load carrying structure by opening the fabric sail 3 to its wing-like form and maintaining that form while in use and by directly connecting to the payload. This structure opens and closes similar to an umbrella. (see FIGS. 3A–3E) In the open position, the leading edge spars 7 form the basic, swept-back, delta wing commonly known in the aeronautical art. The cross spars 9 lock the leading edge spars 7 into place, thereby preventing the wing 1 from closing during operation, while the slider 13 allows the movement of the cross spars 9 from the closed position to the open position. Consequently, all of these spars have a sufficient diameter and are formed of a suitable material to attain a mechanical strength sufficient to maintain the wing form while operating with a payload. In one embodiment, the leading edge spar length can be about 17.5 feet to about 18.5 feet for a 30 foot span wing with a diameter of about 2.5 inches to about 3.0 inches for use with a payload up to about 1,500 pounds. Suitable spar materials include, but are not limited to: aluminum and other lightweight metals such as stainless steel and others, and composites such as epoxy graphite and others commonly known in the art.

With continuing reference to FIGS. 1–2, the leading edge spars 7 located along the leading edge 17 of the fabric sails 3, join together at approximately the front most point 21 of the fabric sail 3 adjacent to the ram air intake 15 (discussed below). The length of each leading edge spar 7 is dependent upon the desired size of the wing 1, which is only limited by practical considerations: size once folded, size of the landing area, weight of the payload, etc. In order to reduce the closed wing storage volume, each leading edge spar 7 can have telescoping members 7a such that in the closed position, each leading edge spar 7 extends to a portion of the length of the leading edge 17 of the fabric sail 3, while in the open position, the leading edge spars 7 in conjunction with the telescoping members 7a extend to the full length of the leading edge 17. These telescoping members 7a are typically slidably located within the leading edge spars 7, and can be hollow structures such as tube-like, D-shaped, or even C-shaped structures, among others. During deployment of the wing 1, the telescoping members 7a are pulled from within the leading edge spars 7 to form the full length of the leading edge 17 of the wing.

Since the fabric sail 3 is disposed around the internal structure and therefore the leading edge spars 7 and the telescoping members 7a, the manner in which each telescoping member 7a deploys, from the closed to the open position, is important. If the fabric sail 3 becomes twisted during deployment due to unexpected turning of the telescoping members 7a, the elevon trim position is effected, thereby decreasing the wings flight performance or even preventing successful flight. Consequently, the telescoping members 7a are fabricated such that they deploy in a predetermined fashion, i.e. straight without turning or by turning a predetermined amount. Such deployment can be accomplished via the employment of a track V-shaped channel, cable within the leading edge spar 7 which the telescoping member 7a follows during deployment and/or a similar deployment scheme. Additionally, after deployment, these telescoping members 7a lock into the open position via conventional means.

Referring now to FIGS. 3A–3E, once the leading edge spars 7 are in the open position, they form an angle θ. The size of this angle θ depends upon aerodynamic considerations including aspect ratio, yaw stability, and deployment simplicity, among others. Typically, θ ranges from about 90° to about 150° with about 105° to about 110° preferred due to simplicity of the deployment mechanism geometry. Angles greater than about 150° result in more complex, and therefore less desirable, mechanical/structural geometry and decreasing yaw stability, while angles less than about 90° result in decreasing glide ratio. Yaw stability is where wing sweep allows the wing to tend to maintain its flight directly into the wind, commonly known as maintaining the yaw heading. As the wing yaws, the windward wing tends to drag more than the leeward wing, thereby correcting for the yaw.

Referring now to FIGS. 1–2 in conjunction with FIGS. 3A–3E, connected to and disposed between the leading edge spars 7, the keel spar 11 adds structural integrity to the fabric sail 3 by ensuring that the fabric sail 3 opens to and maintains its full length from the leading edge 17 to the trailing edge 19, commonly known as the wing's chordwise length. As with the leading edge spars 7, the keel spar 11 can have telescoping members (not shown) to decrease the keel spar's overall length while in the closed position. The length of the keel spar 11 is substantially equivalent to the chordwise length of the wing at the root (very center line) which, as with the leading edge spars' 7 length, is determined on a practical basis with aeronautical considerations effecting the ultimate size. The wing span corresponds to the greatest length from one elevon strut 23 to the same point on the opposing elevon strut 23. A 30 foot span wing typically has a keel length of about 7 feet to about 14 feet, with a length of about 9 feet to about 11 feet preferred. Generally, the wing span to keel length is about 2:1 to about 4:1 with about 3:1 preferred.

The cross spars 9 similarly provide structural integrity to the wing 1 by providing strength to the leading edge spars 7 to ensure that once the wing 1 is in the open position, the leading edge spars 7 remain therein. These cross spars 9 are pivotally connected to the leading edge spars 7 at point 9a and are pivotally connected to the keel spar 11 via the slider mechanism 13 such that in the closed position, the cross spars 9 are folded, aligned coaxially with and substantially parallel to the keel spar 11 and leading edge spars 7, and disposed between the leading edge spars 7 and the keel spar 11. In such a position, the slider mechanism 13 is located adjacent to the front point 21 on the keel spar 11.

With continuing reference to FIGS. 1–2 in conjunction with FIGS. 3A–3E, in the open position, the cross spars 9 are fully extended and typically positioned at an angle π of about 90° or less. At greater than about 90°, the cut-outs 5a in the fabric ribs 5 become excessively large due to the increased amount of slider 13 travel, thereby reducing the fabric ribs' 5 ability to properly define the wing's airfoil shape and reducing the mechanical strength of the fabric ribs 5. Therefore, an angle π of less than 90° is preferred, with π typically equal to about 65° to about 85°. Stops can be employed to lock the cross spars 9 into place at the desired angle π. Preferably, pins are located in the sliding mechanism 13 and holes are located in the keel spar 11 such that when the cross spars 9 reach the desired position, the pins fall into the holes in the keel spar 11, thereby locking the cross spars 9 into position.

The attachment point of the cross spars 9 to the leading edge spars 7 and the angle π determines the cross spar 9's length. In one embodiment, the attachment point is typically between about 45% and about 80% of the leading edge spars 7 length, with about 55% to 65% preferred, and about 57% to about 62% especially preferred. Consequently, for a 30 ft wing span with a 17.5 ft leading edge spars and 12.25 ft attachment point, a 85° angle π, the cross spars 9 are about 9.5 ft long.

Side cables 33 are attached to the leading edge spar's 7 at approximately 45% to 80% of the leading edge spar's length, typically at point 9a and extend downward and inward to attach to the payload below. The cables 33 provide support to each wing half and relieve cantilever loads which allow the structural components to be smaller and lighter. The attachment point puts the cross spar 9 in compression without imposing further cantilever load on the leading edge by providing a downward load path and reducing the length of cantilevered load.

With continued reference to FIGS. 1–2 in conjunction with FIGS. 3A–3E, the elevon struts 23, usually which provide structural integrity to the end of the wing 1 and tension along the sail trailing edge 19, are connected to the leading edge spars 7 at the second end 25a and 25b. For example, for a 30 ft wing span the keel spar 11 is about 10 ft with the elevon struts 23 being about 3 feet. As with the keel spar 11, these elevon struts 23 extend rearward from the leading edge 17 of the wing 1 to the trailing edge 19 thereof, running parallel to the keel spar 11. Depending upon the desired shape of the wing tip, elevon struts 23 may be shortened or bowed. On a 30 ft wing, for example, the elevon struts can be about 35 inches to about 45 inches long with an outer diameter of about 0.80".

In a configuration as shown in FIGS. 1 and 2, the elevon struts 23 are also employed for controlling the wing 1 during operation. These elevon struts 23 connect to a motor or fluid actuator which in turn connects to the leading edge spar 7. During flight the elevon struts 23 are individually deflected or rotated out of the plane of the sail as shown by arrows "A" and "B" in FIG. 1, thereby controlling the flight of the wing. By rotating the elevon strut 23, the end of the sail (wing tip 35a and 35b) is twisted up or down relative to the leading edge. This helical twisting of the sail results in an aerodynamic force sufficient to pitch or roll the wing. Rotating or deflecting the elevon struts 23 in unison generates an aerodynamic force substantially behind the pressure center of the wing which is located at the point about 55% down the keel from the front point 21, thereby forming a moment force about the pressure center which is used for pitch control of the wing. By rotating or deflecting the elevon struts 23 singularly or in opposite directions, aerodynamic forces at the wing tips 35a and 35b can be controlled in magnitude and direction, up or down. For example, if the right elevon strut 23 is rotated up while the left is rotated down, a downward force is generated on the right tip 35a and an upward force on the left tip 35b, resulting in a right roll or turn. Other conventional devices can be employed such as pneumatic and hydraulic devices, among others.

These elevon struts 23, or other control devices, can be operated with any conventional motor capable of generating sufficient torque to overcome the aerodynamic forces at a speed sufficient for control response. Factors important in determining the required torque include wing area, wing loading, aspect ratio, and elevon strut length, among others. A wing having a 30 foot wing span, for example, with a sail area of about 190 ft$^2$ and a 700 lb load requires about 40 to about 80 ft lb torque while a 15 ft wing span wing with an area of 45 ft$^2$ and a 90 lb load needs about 15 to about 25 ft. lb torque for control.

Figure 6:
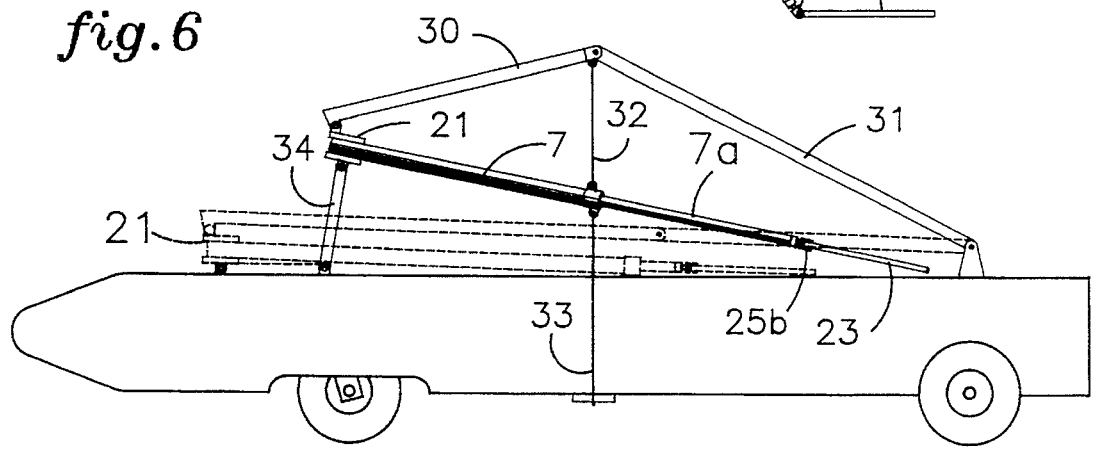
FIG. 6 is a side view of one embodiment of the deployable wing attached to a payload.

In addition to the leading edge spars 7, cross spars 9, elevon struts 23, and the keel spar 11, upper rigging spars 30, 31 and cables 32, can be used to provide additional support to the wing, particularly in negative (inverted flight) conditions. (see FIGS. 6 and 7) Forward and aft spars 30 and 31 pivotally attach external to the fabric sail 3 at the forward and aft ends of the keel spar 11 and join each other above the keel spar 11 at the point where the cables 32 cross over the keel spar. The cables 32 attach at the junction of the forward and aft spars 30 and 31, and at the junction 9a of each leading edge spar 7 and the cross spar 9.

As stated above, the fabric sail 3 encompasses the leading edge spars 7, the keel spar 11, the cross spars 9, and the elevon struts 23 with an upper section 3a and a lower section 3b which are joined around the perimeter to form an envelope which can be filled with air to form the airfoil wing shape shown in FIG. 4. Although it is not required that the fabric sail 3 be airtight, beside the ram air inlet 15, it is preferred that the upper and lower sections be completely sealed around the periphery, particularly along the trailing edge to ensure that the fabric sail 3 remains inflated and thereby rigid during flight. Internal pressure stiffens the fabric sail 3 which forms the airfoil shape defined by the fabric ribs 5, providing lift and reducing or eliminating sail flutter which can increase drag and thereby reduce the glide ratio.

As can be clearly seen in FIG. 4, the size of lower section 3b of the wing corresponds to the amount of fabric required to encapsulate the leading edge spar 7 and to extend therefrom to the trailing edge 19 of the wing. Although it is not necessary to encapsulate the leading edge spar 7 within the lower section 3b, such construction is preferred due to the enhanced aerodynamic shape of the wing during operation. The lower section 3b is patterned such that when the wing is deployed, the lower sail section 3b is pulled taught, extending rearward from the center of the leading edge spar 7. By maintaining tension in the lower section 3b, the inflated airfoil shape can be better controlled. The lower section 3b encapsulates the leading edge spar 7 and attaches to itself at point 27 such that the remainder of the lower section 3b extends rearward and substantially aligns with the center of the leading edge spar 7. Preferably, the lower section 3b is patterned with a luff curve. In this embodiment, the leading edge 17 is straight from the forward point 21 to the cross spar junction 9a. (also see FIG. 2) From the cross spar junction 9a to the second end 25a and 25b of the leading edge spars 7, the lower section 3b curves toward the keel spar 11 to flex the leading edge spar 7 and further tighten the lower section 3b, commonly known as a luff curve. In a 30 ft wing, for example, this luff curve can be a deflection (of the wing tip from point 9a) of up to 1 ft or more.

The envelope formed by the fabric sail 3 is completed with the upper section 3a of the fabric sail 3 connecting to the periphery of the lower section The size of the upper section 3a of the fabric sail depends upon the size of the lower section 3b and the size of the fabric ribs 5 since the fabric ribs 5 define the desired lift shape of the inflated fabric sail 3 (discussed below). This size can readily be determined by artisans based upon conventional aeronautical considerations. One airfoil shape which can be employed comprises the upper section 3a being about 5% to about 15% larger chordwise than the lower surface sail 3b, with about 8% to about 11% preferred. A larger upper section 3a forces the air to travel a greater distance over the top of the sail, causing the air to spread out, forming a low pressure, and thereby causing lift.

Referring again to FIGS. 1–2, a plurality of fabric ribs 5 which are disposed between and connect to the upper section 3a and the lower section 3b of the fabric sail 3, define and maintain the desired lift shape of the inflated fabric sail 3. Consequently, the fabric ribs 5 have an airfoil shape. These fabric ribs 5 connect to the lower section 3b near the front of the leading edge spar 7 such that the lower section 3b is disposed between the fabric rib 5 and the leading edge spar 7. From point 5b to the trailing edge 19, the lower portion of the fabric rib 5 conforms to the geometry of the lower section 3b. Since the upper portion of the fabric rib 5 defines the airfoil shape of the inflated fabric sail 3, this portion should conform to the desired inflated wing aerodynamic shape. Conventional aerodynamic shapes which can be employed include: high lift/low speed airfoil sections, and others conventionally known in the aerodynamic art such as those described in the "Theory of Wing Sections" by Ira H. Abbott and Albert E. Von Doenhoff. The preferred upper portion rib shape is patterned after a Clark-Y airfoil section with a maximum thickness of 12.2% of the chord length with the maximum thickness occurring at 29.5% of the chord length measured from the front of the fabric rib 5. This preferred shape attains an improved glide ratio of about 13:1. Each fabric rib 5 allows opening and closing of the cross spars 9 via a cutout 5a where the cross spars 9 pass from the keel spar 9 to the leading edge spars 7.(see FIGS. 1 and 2) The size of this cutout 5a substantially corresponds to the chordwise travel area of the cross spars 9 from the closed position to the open position.

In addition to defining and maintaining the desired inflated shape, the fabric ribs 5 also transfer the load from the upper section 3a of the wing to the lower section 3b. It is commonly known that as an airfoil travels through the air, a majority of the lifting force is obtained via a low pressure above the airfoil. By a spanwise distribution of fabric ribs 5 this lifting force is transferred from the upper surface 3a to the lower surface 3b at each fabric rib 5. Consequently, the preferred number of fabric ribs 5, which can readily be determined by an artisan, corresponds to the number necessary to transfer a sufficient amount of the load and define and maintain the airfoil shape to allow efficient flight.

With continuing reference to FIGS. 1–2, the fabric ribs 5 spacing is determined by the number of fabric ribs 5 which, in turn, is a function of the criticality of airfoil definition versus weight and fabrication costs. A total of up to about 30 or more ribs can be utilized depending upon the size of the wing, with about 8 to about 25 fabric ribs preferred for wings having wing spans of about 15 ft to about 30 ft, and about 14 to about 18 fabric ribs 5 especially preferred. Typically, these fabric ribs 5 are aligned substantially parallel to one another, substantially equidistant apart from the keel spar 11 to the elevon struts 23, and coaxially with the keel spar 11. The two central ribs, however, can be employed to form a pocket to contain the keel spar 11, and therefore are not equidistant from both the keel spar 11 or one another (with relation to the other ribs).

The sections of the fabric sail 3 can be formed of any conventional fabric which is sufficiently flexible to allow folding for packing, sufficiently elastic to dampen the shock loads of deployment, yet not elastic to the point where shape definition is lost, and possesses sufficient mechanical integrity to withstand the deployment, operation loads, and payloads. Normally, a nylon or dacron fabric can be employed. Where high strength is needed, kevlar or spectra cloths can be used, typically resin coated cloth which has decreased porosity such as polyurethane coated cloth is preferred for the upper and lower sections 3a and 3b which are preferably also substantially non-porous to contain the air when pressurized by ram air inflation. For example, since the fabric ribs 5 transfer the load from the upper section 3a to the lower section 3b of the fabric sail 3, a light-weight fabric can be utilized for the upper section 3a with a heavier weight fabric utilized for the lower section 3b. Rip stop 1.25 oz/yd$^2$ (ounces/square yard) nylon can be utilized for the upper section 3a and for the fabric ribs 5 with 4.0 oz/yd$^2$ dacron used for the lower section 3b. Note, multiple layers can be employed at stress points such as at the trailing edge and others.

The envelope formed by the fabric sail 3 is inflated during operation with air rammed into the wing through an intake opening 15 located at the nose stagnation point of the fabric sail 3, commonly known as ram air and ram air intake 15. The ram air pressurizes the envelope formed by the fabric sail 3, stiffening the fabric sail 3, eliminating sail flutter, and causing the wing 1 to take on an airfoil shape and behave similar to a rigid wing. The size of the ram air intake 15, which can readily be determined by one skilled in the aerodynamic field, depends upon corresponding the time required to fill and pressurize the wing with the time required for mechanical opening during deployment. Typically, the ram air intake 15 is about 0.5 ft$^2$ to about 0.75 ft$^2$ for a 30 foot span wing. The ram air intake 15 must also be sufficiently large to allow in sufficient air to make up air for leakage.

Referring to FIGS. 3A–3E and 5–7, deployment comprises dropping the closed wing from an aircraft, decelerating and stabilizing the wing nose-down, by deployment of a drogue parachute. Once stable, the parachute's suspended load is released from the payload and transferred to the slider 13, thereby applying a rearward tension. This load transfer may be accomplished by a release mechanism initiated by either a timer, an altimeter, or other signal. For example, the release mechanism can be a mechanical latch which when tripped by an electrical signal, unlatches or releases the drogue parachute line from the payload, thereby causing tension on the line connected to the slider 13. Telescoping members can be extended by a similar parachute tension force or by applying pneumatic pressure to an internal piston. As the internal structure extends to its open position, the wing inflates with ram air. The opened, inflated wing can then be guided to its desired destination.

The rearward force applied to the slider 13 by the drogue parachute causes the internal structure of the wing to deploy. (see FIG. 5) In one embodiment, this action accomplishes the following mechanical actuation: the cross spars 9 push against the leading edge spars 7 to move the leading edge spars 7 to the proper swept, delta geometry; the telescoping keel spar 11 retracts (shortens) causing the upper rigging spars 30 and 31 to erect and a rearward movement of the entire wing relative to the keel spar 11 attachment to the payload. This rearward movement causes the wing to rotate up (pitch up) about a pair of nose struts 34 to an angle of incidence relative to the payload. Once the keel spar 11 has retracted and the leading edge spars 7 have moved to the deployed geometry, the slider 13 aligns with holes in the keel spar 11 inner and outer tubes. A latching pin falls into the aligned holes to lock the cross spars 9 and, therefore the wing structure, into the deployed configuration. This latching action also releases the drogue parachute line, allowing the wing to begin flight. Note, whether to use nose struts 34 is dependent upon the flight geometry of the payload. If the payload flies more efficiently into the wind, the wing 1 should be close-coupled to the payload, eliminating the need for nose struts 34 and possibly eliminating the need for a retractable keel spar 11. However, if the wing's flight ability decreases when close-coupled to the payload, the nose struts 34 can be employed to change the angle between the wing and the payload.

As is clear from the above description of the present invention, there are numerous advantages achieved with the deployable wing. Unlike previous gliders and parachutes, the wing of the present invention is both deployable and remotely controllable or can be controlled by an onboard autopilot system. This wing can be folded, conveniently stored, deployed for an air drop, directed to the desired location, and landed at the target area.

The deployable wing of the present invention attains a glide ratio up to or exceeding about 12:1, and greater than 8:1 with typical payloads of about 1,000 pounds for a 30 ft wing, while gliding parachutes with payloads of about 1,000 pounds typically have glide ratios of about 3:1 and hang gliders have glide ratios of about 10:1. The deployable wing is particularly useful in operations such as cargo delivery since the wing, with a cargo (payload), can be released from an air-craft, deployed in motion, and safely maneuvered to the precise desired destination.

It is also understood that the deployable wing of the present invention can be utilized for powered flight, particularly for retrieval of equipment and other objects from locations whose distance is greater than the glide range of the wing.

Although the invention has been shown and described with respect to detailed embodiments thereof, it will be understood by those skilled in the art that various changes in form and detail thereof may be made without departing from the spirit and scope of the claimed invention.

We claim:

1. A deployable wing, comprising:
   a. a double membrane fabric sail having an upper section disposed above and joined to a lower section, said sail having a leading edge with a front point, a trailing edge, and wing tips,
   b. an internal structure disposed between said upper section and said lower section, said internal structure having,
      i. two leading edge spars, each of said leading edge spars having a first end and a second end, said first ends of said leading edge spars pivotally connected together at approximately said front point,
      ii. a keel spar connected to and disposed between said leading edge spars at said front point and extending rearward toward said trailing edge, and
      iii. at least two cross spars pivotally attached to said leading edge spars and to a sliding mechanism which transverses along said keel spar;
   c. a plurality of fabric ribs disposed between and connected to said upper section and said lower section, wherein said fabric ribs have at least one slot through which said cross spars extend from said keel spar to said leading edge spars and said fabric ribs define a shape of said fabric sail when inflated, and
   d. a ram air intake located on said leading edge at the stagnation point of the wing during operation.

2. A deployable wing as in claim 1 further comprising at least one elevon strut attached to said second end of each of said leading edge spars wherein said elevon struts can be moved to thereby control the wing's flight.

3. A deployable wing as in claim 2 further comprising an actuator for moving said elevon struts such that said wing tips move out of the plane of the wing.

4. A deployable wing as in claim 1 further comprising external rigging, wherein said rigging comprises at least two upper rigging spars pivotally joined together above said keel spar, and at least two cables connecting from said upper rigging joint to said leading edge spars.

5. A deployable wing as in claim 1, wherein each of said leading edge spars have at least one telescoping member to accommodate small packaging constraints.

6. A deployable wing as in claim 1, wherein said lower section extends rearward from and substantially aligns with the center of said leading edge spars.

7. A deployable wing as in claim 6, wherein said lower section substantially encapsulates said leading edge spars.

8. A deployable wing as in claim 7 wherein said lower section forms a luff curve from said connection of said cross spars to said leading edge spars to said second ends of said leading edge spars.

9. A deployable wing as in claim 1 further comprising a control device for twisting a portion of said leading edge spars to control the flight of said wing by deforming the shape of said wing.

10. A deployable wing as in claim 1, wherein said fabric ribs have a length and a thickness with a maximum thickness of about 10% to about 15% of said length and occurring at about 27% to about 33% of said length.

11. A method for air dropping a payload, which comprises:
   a. providing a deployable wing comprising:
      i. a double membrane fabric sail having an upper section disposed above and joined to a lower section, said sail having a leading edge, and wing tips,
      ii. an internal structure disposed between said upper section and said lower section, said internal structure having,
         a. two leading edge spars with a first end and a second end, said first ends of said leading edge spars pivotally connected together at approximately said front point,
         b. a keel spar connected to and disposed between said leading edge spars at said front point and extending rearward toward said trailing edge, and
         c. at least two cross spars pivotally attached to said leading edge spars and to a sliding mechanism which transverses along said keel spar;
      iii. a plurality of fabric ribs disposed between and connected to said upper section and said lower section, wherein said fabric ribs have at least one slot through which said cross spars extend from said keel spar to said leading edge spars and said fabric ribs define a shape of said fabric sail when inflated, and
      iv. a ram air intake located on said leading edge at the stagnation point of the wing during operation, wherein said deployable wing is in a closed position such that said leading edge spars are aligned parallel to said keel spar;
   b. attaching the payload to said deployable wing; and
   c. deploying said wing from an aircraft, wherein said leading edge spars open, said sliding mechanism moves rearward toward the trailing edge and locks said cross spars into place and air enters said wing through said ram air intake to inflate said wing and form an airfoil shape.

12. A method as described in claim 11, wherein said leading edge spars have telescoping members which telescope to their open position during deployment.

13. A method as described in claim 11, wherein said deployable wing has an elevon strut connected to the second end of each of said leading edge spars and is remotely controlled via said elevon struts.

14. A method as described in claim 11, wherein said wing is deployed utilizing a drogue parachute attached to said payload and said sliding mechanism.

15. A remotely controllable wing, said wing having a delta-wing geometry, comprising:
   a fabric sail having an upper section joined to a lower section and including an intake opening;
   an internal structure disposed substantially between said upper section and said lower section, said internal structure including at least two leading edge spars connected together at approximately a front point, a keel spar connected to and disposed between said leading edge spars at said front point and at least one cross spar attached to said leading edge spars;

a plurality of elevon struts connected to the internal structure and substantially enclosed within the fabric sail; and a control device operatively connected to at least one of said elevon struts, said control device being remotely operable to move at least one of said elevon struts between a first position substantially within a plane defined by the wing and a second position substantially out of the plane of the wing.

16. A remotely controllable wing as in claim 15, wherein said control device is a motor or actuator.

17. A method for remotely controlling a wing, which comprises:
   a. providing a deployable wing comprising:
      i. a fabric sail having an upper section joined to a lower section and including an intake opening;
      ii. an internal structure disposed substantially between said upper section and said lower section, said internal structure including at least two leading edge spars connected to either at approximately a front point, a keel spar connected to and disposed between said leading edge spars at said front point and at least one cross spar attached to said leading edge spars;
      iii. a plurality of elevon struts connected to the internal structure and substantially enclosed within the fabric sail;
      iv. a remotely operable control device operatively connected to at least one of said elevon struts; and
   b. signaling said control device to move at least one of said elevon struts between a first position substantially within a plane defined by the deployable wing and a second position substantially out of the plane of the wing.

* * * * *